(12) United States Patent
Bimson et al.

(10) Patent No.: US 8,683,310 B2
(45) Date of Patent: *Mar. 25, 2014

(54) INFORMATION ARCHITECTURE FOR THE INTERACTIVE ENVIRONMENT

(75) Inventors: Andrea Bimson, Scottsdale, AZ (US); Jin Chyung, Hamburg (DE); Meena Gopakumar, Glendale, AZ (US); Lorraine Miranda, Phoenix, AZ (US); Biswajit Sarkar, Phoenix, AZ (US); Shashikant Rao, Phoenix, AZ (US); Kaustubh Kunte, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/195,561

(22) Filed: Aug. 1, 2011

(65) Prior Publication Data

US 2011/0307775 A1    Dec. 15, 2011

Related U.S. Application Data

(63) Continuation of application No. 11/871,979, filed on Oct. 13, 2007, now Pat. No. 7,992,079, which is a continuation of application No. 09/769,887, filed on Jan. 25, 2001, now Pat. No. 7,293,230.

(60) Provisional application No. 60/178,456, filed on Jan. 27, 2000.

(51) Int. Cl.
*G06F 17/00* (2006.01)

(52) U.S. Cl.
USPC ............ 715/200; 715/234; 715/205; 715/255

(58) Field of Classification Search
USPC .......................... 715/200, 205–208, 234, 255
See application file for complete search history.

(56) References Cited

U.S. PATENT DOCUMENTS

| | | | |
|---|---|---|---|
| 5,649,186 A | 7/1997 | Ferguson | |
| 5,778,368 A | 7/1998 | Hogan et al. | |
| 5,813,020 A * | 9/1998 | Hohensee et al. | 715/234 |
| 5,852,713 A | 12/1998 | Shannon | |
| 5,860,068 A | 1/1999 | Cook | |
| 5,860,073 A | 1/1999 | Ferrel et al. | |

(Continued)

FOREIGN PATENT DOCUMENTS

WO    9715018    4/1997

OTHER PUBLICATIONS

PCT; International Search Report dated Aug. 6, 2002 in Application No. PCT/US2001102524.

(Continued)

*Primary Examiner* — Thu Huynh
(74) *Attorney, Agent, or Firm* — Snell & Wilmer L.L.P.

(57) ABSTRACT

A system and method for providing management such as creation, manipulation, storage, control, and retrieval of digital content for a company on a global basis. Digital content is created and stored in, for example, the eXtensible Markup Language (XML) format using the relationship between component mapping information and content information comprising webpage components. The XML data is developed by defining page components, mapping the components on a page and indexing the page for future retrieval of the page. The data is then stored in a single database, as segments related to the page, for call-up by a user.

18 Claims, 5 Drawing Sheets

(56) References Cited

U.S. PATENT DOCUMENTS

| | | | |
|---|---|---|---|
| 5,877,519 | A | 3/1999 | Jewell |
| 5,945,989 | A | 8/1999 | Freishtat et al. |
| 5,970,490 | A | 10/1999 | Morgenstern |
| 5,983,267 | A | 11/1999 | Shklar et al. |
| 5,999,179 | A | 12/1999 | Kekic et al. |
| 6,003,032 | A | 12/1999 | Bunney et al. |
| 6,005,568 | A | 12/1999 | Simonoff et al. |
| 6,011,844 | A | 1/2000 | Uppaluru et al. |
| 6,012,098 | A | 1/2000 | Bayeh et al. |
| 6,012,984 | A | 1/2000 | Roseman |
| 6,018,343 | A | 1/2000 | Wang et al. |
| 6,018,710 | A | 1/2000 | Wynblatt et al. |
| 6,021,202 | A | 2/2000 | Anderson et al. |
| 6,021,416 | A | 2/2000 | Dauerer et al. |
| 6,026,433 | A | 2/2000 | D'Arlach et al. |
| 6,038,566 | A * | 3/2000 | Tsai ............................... 1/1 |
| 6,052,514 | A | 4/2000 | Gill et al. |
| 6,088,702 | A | 7/2000 | Plantz et al. |
| 6,112,242 | A | 8/2000 | Jois et al. |
| 6,192,382 | B1 | 2/2001 | Lafer et al. |
| 6,321,256 | B1 | 11/2001 | Himmel et al. |
| 6,411,178 | B1 | 6/2002 | Matsumura et al. |
| 6,424,979 | B1 | 7/2002 | Livingston et al. |
| 6,429,880 | B2 | 8/2002 | Marcos et al. |
| 6,430,624 | B1 | 8/2002 | Jamtgaard et al. |
| 6,463,440 | B1 | 10/2002 | Hind et al. |
| 6,489,968 | B1 * | 12/2002 | Ortega et al. ............... 715/713 |
| 6,519,617 | B1 | 2/2003 | Wanderski et al. |
| 6,546,406 | B1 * | 4/2003 | DeRose et al. .............. 715/234 |
| 6,591,248 | B1 | 7/2003 | Nakamura et al. |
| 6,598,219 | B1 | 7/2003 | Lau |
| 6,606,731 | B1 | 8/2003 | Baum et al. |
| 6,643,663 | B1 | 11/2003 | Dabney et al. |
| 6,662,342 | B1 | 12/2003 | Marcy |
| 6,697,822 | B1 | 2/2004 | Armatis et al. |
| 6,715,129 | B1 | 3/2004 | Hind et al. |
| 6,732,330 | B1 | 5/2004 | Claussen et al. |
| 6,738,803 | B1 | 5/2004 | Dodrill et al. |
| 6,795,830 | B1 | 9/2004 | Banerjee et al. |
| 7,072,853 | B2 | 7/2006 | Shkedi |
| 2001/0013004 | A1 | 8/2001 | Haris et al. |
| 2001/0056504 | A1 | 12/2001 | Kuznetsov |
| 2002/0091725 | A1 | 7/2002 | Skok |
| 2002/0112078 | A1 | 8/2002 | Yach |
| 2002/0198979 | A1 | 12/2002 | Yu |
| 2003/0149937 | A1 * | 8/2003 | McElfresh et al. ........... 715/517 |

OTHER PUBLICATIONS

PCT; International Preliminary Examination Report dated Aug. 9, 2002 in Application No. PCT/US2001/02524.

USPTO; Office Action dated Oct. 8, 2010 in U.S. Appl. No. 11/871,979.

USPTO; Notice of Allowance dated Mar. 25, 2011 in U.S. Appl. No. 11/871,979.

Jaxo, LTD XGate—White Papers, The Enterprise, its data and XGate, www.jaxo.com, Dec. 6, 1998, the whole document.

Ciancarini, P., et al.; Managing Complex Documents over the www: A case study for XML; IEEE Transactions on Knowledge and Data Engineering, Jul. 1999, pp. 629-638, vol. 11, No. 4, III Inc., New York US.

Zhang, Z., et al.; A Tool for Distributed Authoring and Publishing, Proceedings of the Annual Conference of American Society of Information Science, ASIA 99, Nov. 1999, pp. 1-15, http://www.citeseer.nj.nec.com/198653.html.

Wang, W.; Team-and-Role-Based Organizational Context and Access Control for Cooperative Hypermedial Environments, Proceedings of ACM Hypertext 99, Feb. 23-25, 1999, pp. 37-46, http://www.citeseer.nj.nec.com/220853.html.

Peters, R., et al., Crystal Web—A distributed authoring environment for the World Wide Web, Computer Networks and ISDM Systems, Apr. 1, 1995, pp. 861-870, vol. 27, No. 6, North Holland Publishing, Amsterdam, NL.

Non-Final Rejection mailed Jul. 2, 2004 in U.S. Appl. No. 09/769,887 by Andrea Bimson.

Final Rejection mailed Feb. 28, 2005 in U.S. Appl. No. 09/769,887 by Andrea Bimson.

Advisory Action mailed Apr. 13, 2005 in U.S. Appl. No. 09/769,887 by Andrea Bimson.

Non-Final Rejection mailed Jun. 14, 2005 in U.S. Appl. No. 09/769,887 by Andrea Bimson.

Final Rejection mailed Nov. 1, 2005 in U.S. Appl. No. 09/769,887 by Andrea Bimson.

Advisory Action mailed Jan. 5, 2006 in U.S. Appl. No. 09/769,887 by Andrea Bimson.

Non-Final Rejection mailed Jun. 27, 2006 in U.S. Appl. No. 09/769,887 by Andrea Bimson.

Non-Final Rejection mailed Dec. 12, 2006 in U.S. Appl. No. 09/769,887 by Andrea Bimson.

Final Rejection mailed May 1, 2007 in U.S. Appl. No. 09/769,887 by Andrea Bimson.

Advisory Action Rejection mailed Jul. 5, 2007 in U.S. Appl. No. 09/769,887 by Andrea Bimson.

Notice of Allowance and Fees Due mailed Aug. 22, 2007 in U.S. Appl. No. 09/769,887 by Andrea Bimson.

Issue Notification mailed Oct. 17, 2007 in U.S. Appl. No. 09/769,887 by Andrea Bimson.

* cited by examiner

INFORMATION ARCHITECTURE FOR THE INTERACTIVE ENVIRONMENT

CROSS-REFERENCE TO RELATED APPLICATIONS

This application is a continuation of, claims priority to and the benefit of U.S. Ser. No. 11/871,979 filed on Oct. 13, 2007 and entitled "INFORMATION ARCHITECTURE FOR THE INTERACTIVE ENVIRONMENT". The '979 application is a continuation of, claims priority to and the benefit of U.S. Pat. No. 7,293,230 issued on Nov. 6, 2007 (aka Ser. No. 09/769,887 filed on Jan. 25, 2001) and entitled "INFORMATION ARCHITECTURE FOR THE INTERACTIVE ENVIRONMENT". The '230 patent is the non-provisional of, claims priority to and the benefit of U.S. Provisional Application No. 60/178,456 filed on Jan. 27, 2000 and entitled "INFORMATION ARCHITECTURE FOR THE INTERACTIVE ENVIRONMENT". The entire contents of all are incorporated herein by reference.

FIELD OF THE DISCLOSURE

The disclosure relates generally to methods and apparatus for managing content of a company-wide intranet or internet website, and more particularly, to systems for organizing data related in a single database so the content can be managed from a global perspective.

BACKGROUND OF DISCLOSURE

As more and more companies begin to provide a presence on the internet, they are confronted with the issues of presentation of information and conformity within the preparation of the presentations. Various schemes have been presented to assist the companies in preparing the presentation screens that would appear on the internet website, along with placing the presentation of the page in a location or locations that are linked, requiring a user to traverse various web pages to obtain the presentation desired. Such approaches have included delegated authority systems, have used content aggregation, have provided graphical interfaces and dynamically generated web documents. Other general website management has included editing and generating information, data access/processing systems, automatic publishing systems and group ware systems. These approaches generally demand a knowledge of the HTML operating language, a capability generally only found in the website programmers and not among general employees.

The prior art generally fails to disclose a process for implementing changes to an internet website, such that employees in a corporation may define and enforce a common style of page layout to provide an application that can be accessed by multiple users at the same time by an internet browser, where the application allows corporate employees to manage content, create new web pages, process content through workflow, and define new content and style which can then be provided to a user without an undue amount of searching to find the desired information. Accordingly, once the presentation page is completed, data elements relating to the significance of the content are utilized to store information relating to the content in various locations or sites, with the various sites interconnected through the use of links. Thus, to obtain the information desired, a user may, of necessity, be forced to traverse several links to obtain the desired page with the required information.

SUMMARY OF THE DISCLOSURE

The previously described deficiencies in the prior art are addressed in the present disclosure which, in conjunction with a content management application, provides an intranet application to provide a system for implementing changes to both an intranet or an internet website and, permitting a company to manage content for its website from a global perspective. The content, created and stored once, can then be shared and managed across a global organization. The information architecture system is the basic underlying infrastructure that allows a company to efficiently manage its content while taking advantage of various efficiencies. The data can thus be viewed from a holistic perspective utilizing a structure of website contents that results from the relationship between objects on the physical pages, i.e., appearance only, instead of the prior art reliance on the significance of the data elements displayed on the page, thereby providing a look and feel driven structure. The system function supports a workflow model for the launching of content and is extensible so the information architecture does not need to be expanded in order to support new data. Further, the system is platform and software independent whereby the content stored in the infrastructure can be delivered on any platform with the system providing granularity of content management. In various embodiments, the system makes use of the extensible Markup Language (XML) to store relevant content. The use of XML provides extensible data schema, content reuse, also known as repurposing, and flexible look and feel. Since the information architecture is XML based, it can be implemented either using a database, XML repository or a flat file based system.

BRIEF DESCRIPTION OF THE DRAWINGS

The above and other features and advantages of the present disclosure are hereinafter described in the following detailed description of various embodiments to be read in conjunction with the accompanying drawing figures, wherein like reference numerals are used to identify the same or similar parts or steps in the similar views, and.

DETAILED DESCRIPTION

The present disclosure may be described herein in terms of functional block components and various processing steps. It should be appreciated that such functional blocks may be realized by any number of hardware and/or software components configured to perform the specified functions. For example, the software elements of the present disclosure may be implemented with any programming or scripting language such as C, C++, Java, PERL, or the like, with the various algorithms being implemented with any combination of data structures, objects, processes, routines or other programming elements. Further it should be noted that the present disclosure may employ any number of conventional techniques for data transmission, signaling, data processing, network control, and the like. Still further, the disclosure could be used to detect or prevent security issues with a scripting language, such as JavaScript, VBScript or the like.

It should be appreciated that the particular implementations shown and described herein are illustrative of the disclosure and its best mode and are not intended to otherwise limit the scope of the present disclosure in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As hereinafter described, the present disclosure is directed to a system and method for providing management such as creation, manipulation, storage, control, and retrieval of digital content for use in such as a company website on a global basis and includes support for new page layouts and component layouts (i.e., support for new presentation styles whether in Hypertext Markup Language (HTML), Wireless Markup Language (WML), PDF, or any other authoring language in which the presentation may be written).

Further, the present disclosure permits content repurposing, i.e., the reuse of existing content for other forms of media once the content has been produced and stored in a database. Accordingly, repurposing permits use of the content in such forms as mail, print, or other websites or any application in which the printed or electronic word is used and which may take advantage of the content stored in the database.

The information architecture of the present disclosure provides for a separation of data from the presentation itself. Thus, the information architecture data content, not being tied to the presentation, may, for example, enable the database to support various foreign languages, formats and medias.

Figure 1:
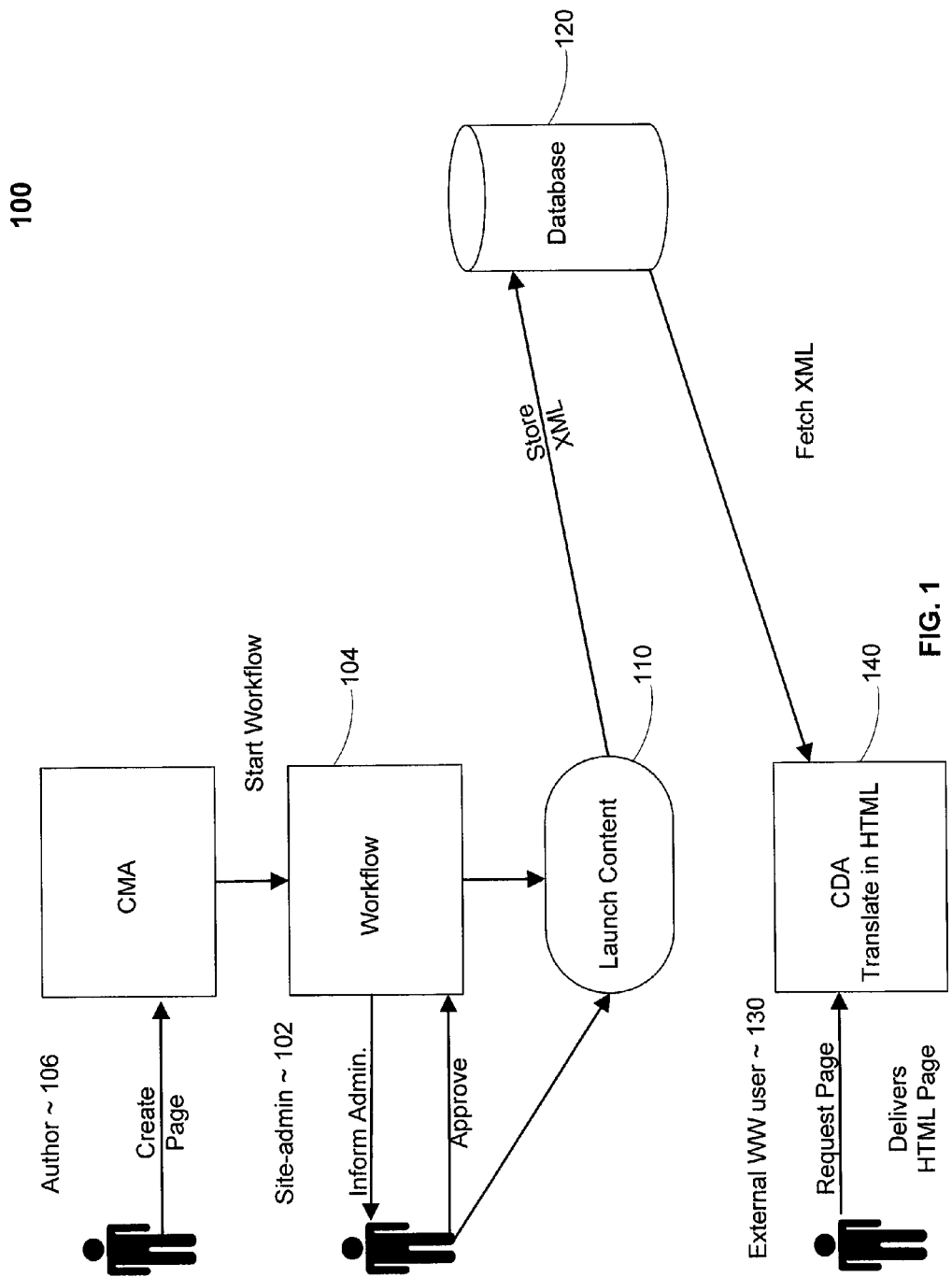
FIG. 1 is an exemplary representation of the workflow and page storage aspect of the present disclosure.

Referring now to FIG. 1, there is shown at 100 an exemplary representation of the flow diagram of the information architecture system of the present disclosure. The site administrator 102, initiates a project to develop a new web page by assigning an author 106 to create the page and its XML representation is stored in the database using a content management application system 108. This starts the workflow 104 whereby the author creates the page, then the author submits it for approval through various levels. Once the approvals are obtained, the site administrator 102 approves a content launch 110. While various scripting languages may be used in creating content and/or a page, by way of example only and not by way of limitation, the content/page is written in the eXtensible Markup Language (XML) and is stored in database 120 as an XML file.

An external web user 130 wishing to access the information contained in the page would request the page through a Content Delivery Application (CDA) translator 140. The CDA translator 140 would query the database 120, retrieve the page and translate the XML file into an HTML page or any other presentation format suitable for user's device for presentation to the user 130.

Figure 2:
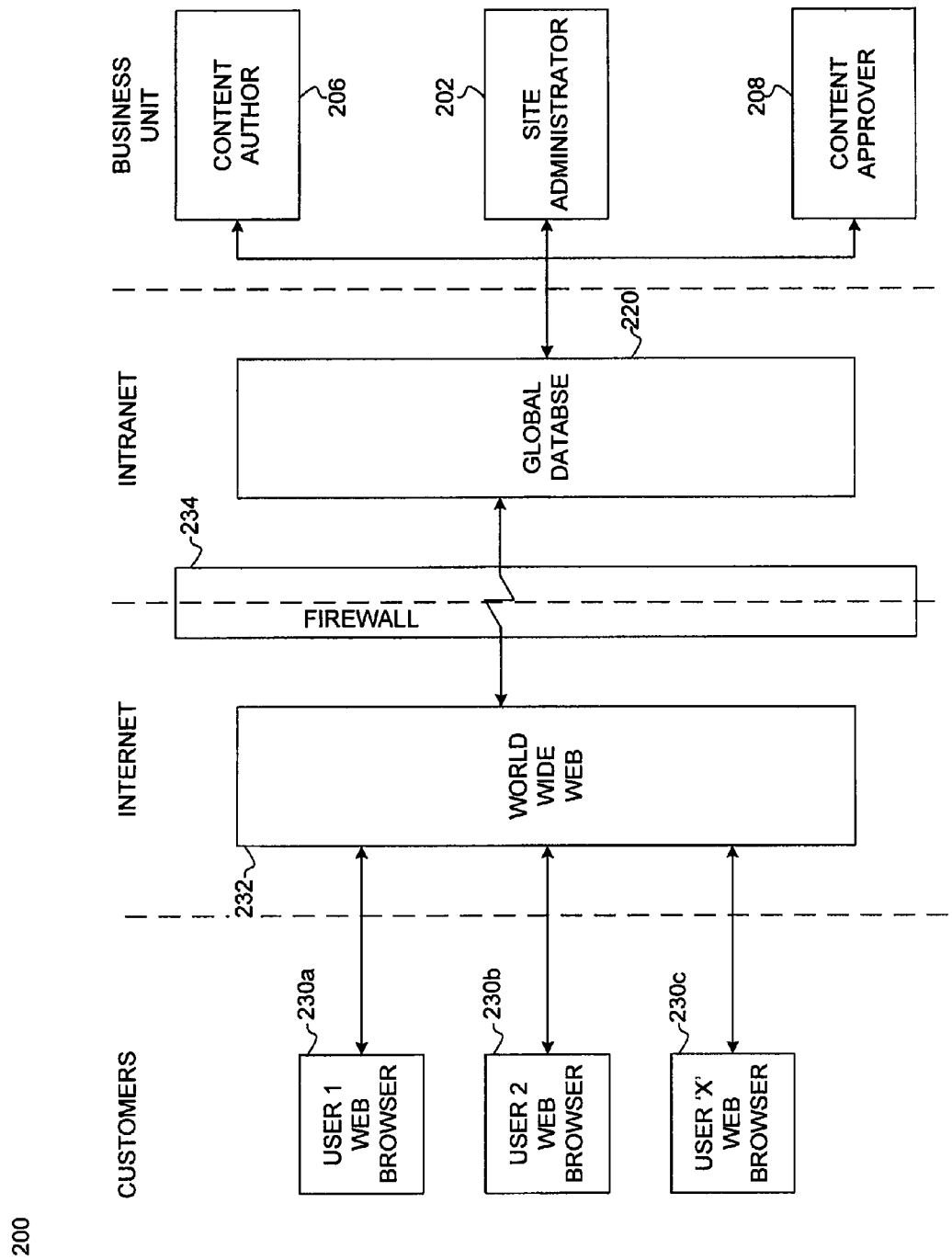
FIG. 2 is an exemplary block diagram depicting an embodiment of the Information Architecture System using Content Management of the present disclosure.

Referring now to FIG. 2, various embodiments is shown at 200. This embodiment uses a workflow group, such as shown in FIG. 1, under control of the local site administrator 202. The workflow group includes a content author 206 and content approvers 208. Once the site administrator 202 initiates a project and verbally communicates the user ID and password to each new user designated in the workflow, designated content author 206 creates and edits items using content management applications.

Designated content approvers 208 review the content items produced by content author 206 and pass them through an approval process. Content approvers 208 mark the items as approved or rejected and, when the new content has been approved by all concerned users in the workflow, local site administrator 202 launches the content to the global database 220. Users, using web browsers 230a, 230b, 230c, interface through the worldwide web 232 to review the launched content. In some instances, the request must be processed through a firewall 234 providing security to the global database 220. Again, the XML file from the global database containing the requested information is processed through a CDA translator into HTML, or a representation suitable for the user's device, passed through the firewall 234 and presented in an HTML or suitable representative language format on the worldwide web 232 for access by the web user requesting the information.

Figure 3:
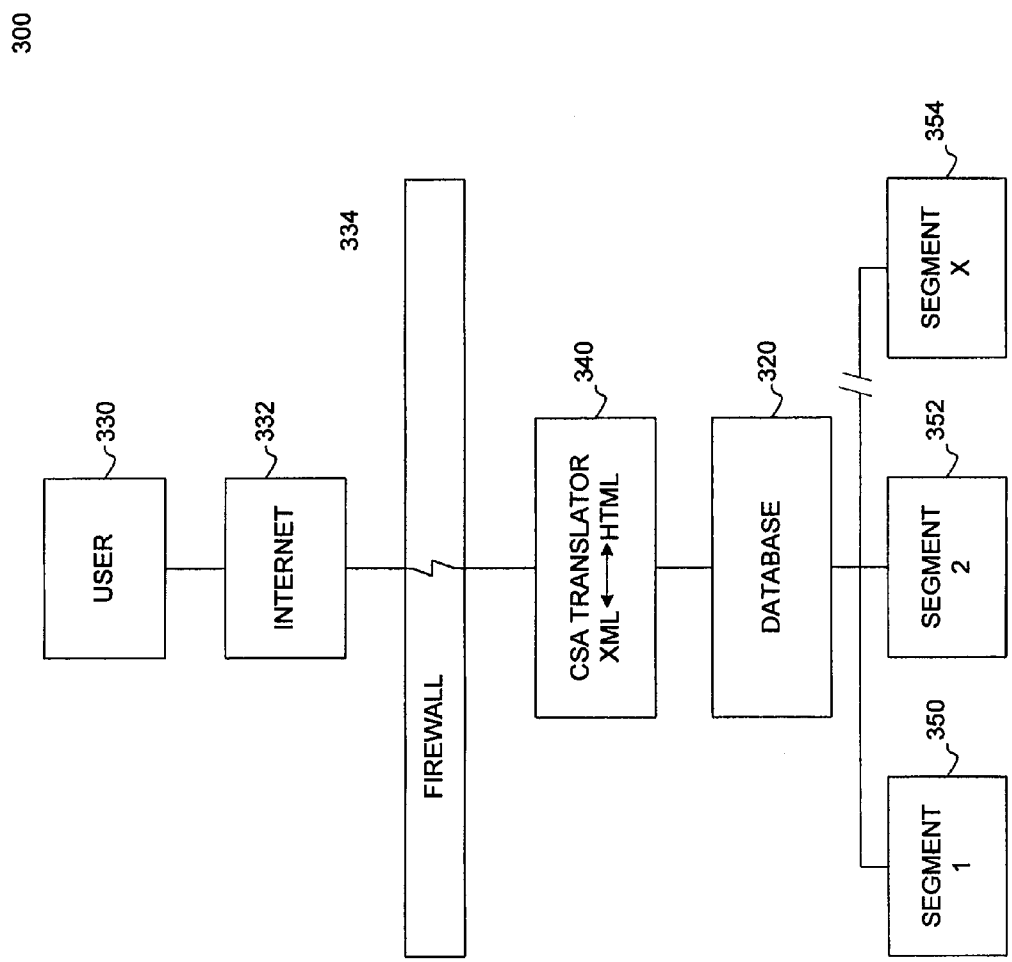
FIG. 3 is an exemplary block diagram depicting a user accessing the global database of the Information Architecture System.

Referring now to FIG. 3, there is shown an exemplary block diagram at 300 of a user accessing the global database of the network architecture system of the present disclosure. A user 330 connects to the internet or worldwide web 332, logging on through a firewall 334, if such is present, to a CDA translator to request information from database 320. The database, comprising various XML files relating to the various pages stored therein in XML, as Segment 1, 350, Segment 2, 352 through Segment X, 354. Once the proper segment containing the requested page is located, it is transmitted from the database 320 to the CDA translator, which translates the XML file to, for example, an HTML page for presentation through the firewall 334 to the internet 332 for presentation to user 330.

Figure 4A:
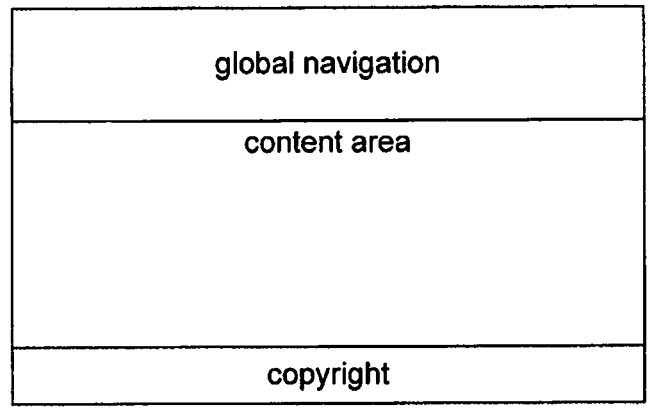
FIGS. 4a-4c are exemplary screen presentations provided by a user of the Information Architecture System.
Figure 4B:
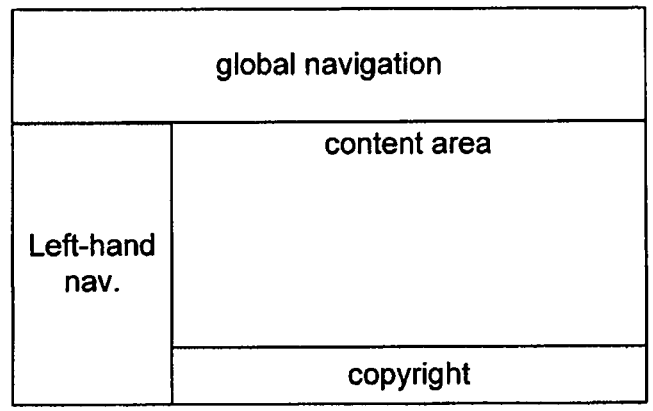
Figure 4C:
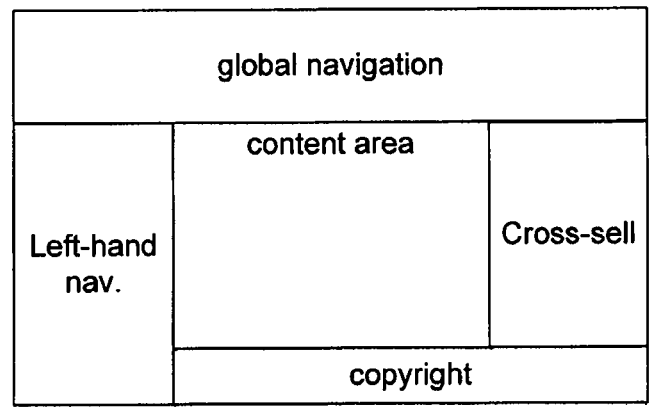

Referring also to FIGS. 4a-4c, exemplary screen presentations accessible by user of the network architecture system are shown. The presentations 4a, 4b, 4c correspond to the various segments 350, 352, 354 depicted in FIG. 3 comprising the information relating to the content contained within the page.

Figure 5:
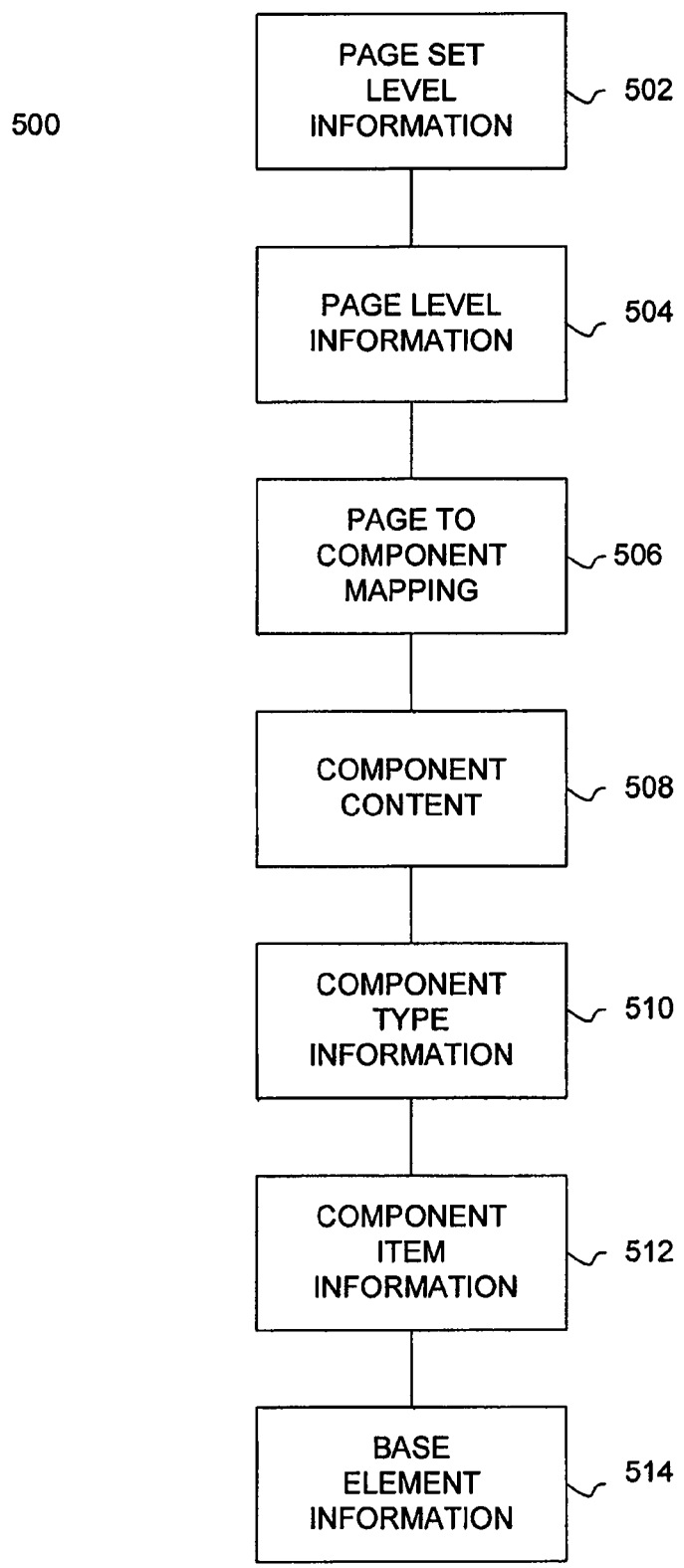
FIG. 5 is an exemplary workflow diagram depicting a logical data model of the information architecture.

Referring now to FIG. 5, each exemplary information segment shown in FIG. 3 may be seen to include a top level index to the information contained within the page/segment at 502. The page index defines the location of page level information at 504. Page level information 504 defines segment component mapping at 506. Information contained within page component mapping 506 relates to component content information 508. Component content information 508 contains information relating to the various parts of a page, such as the navigation components, the cross-sell components, copyright components, and the like. Additionally, the component content information 508 includes page key word relationships, along with the component type information 510. Component type information 510 further defines the component item information used in generating various items within a page. Base element information 514 provides information used in developing the component item information 512.

Accordingly, corresponding structures, acts, and equivalents of all elements in the claims below are intended to include any structural material or acts for performing the functions in combination with other elements as specifically claimed. The scope of the disclosure should be determined by the allowed claims and their legal equivalents, rather than by the examples given above. When a phrase similar to "at least one of A, B, or C" or "at least one of A, B, and C" is used in the claims or specification, Applicants intend the phrase to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. A method comprising:
presenting, by a computer-based system for managing digital content, a component created by a content author to a content approver for review, wherein said content approver designates said component as an approved component;
storing, by the computer-based system, said approved component created by said content author in a globally accessible database,
wherein said approved component is decoupled from a content page,
wherein said approved component includes a category tag corresponding to user preferences;
retrieving, by the computer-based system, a category tag click count for said approved component corresponding to a user;
analyzing, by said computer-based system, said category tag click count and said category tag to determine a level of interest for establishing said user preferences;
retrieving, by said computer-based system, said approved component according to said established user preferences; and
positioning, by said computer-based system, said retrieved component on an updated content page, according to component content information comprising content mapping data, said content mapping data comprising:
instructions for mapping said retrieved component to said updated content page; and
information relating to at least one of: navigation components, cross-sell components, copyright components, page key word relationships, component type information, and information used in generating items on a page.

2. The method of claim 1, further comprising storing said approved component as a markup language file.

3. The method of claim 2, wherein said markup language file is in at least one of: an eXtensible Markup Language (XML) format and an HTML format.

4. The method of claim 2, further comprising translating said markup language file to an HTML format for presentation on a website.

5. The method of claim 2, wherein said storing said approved component as said markup language file includes storing said markup language file in an extensible database that is platform and software independent.

6. The method of claim 2, wherein said storing said approved component as said markup language file includes storing said markup language file in at least one of: a database and a file system.

7. The method of claim 2, wherein said storing said approved component as said markup language file includes storing said markup language file, wherein said markup language file is an XML file, in an extensible database that is platform and software independent.

8. The method of claim 1, further comprising creating said updated content page.

9. The method of claim 1, wherein said component includes a category tag corresponding to said user preferences.

10. The method of claim 1, further comprising receiving a request to create updated content for said updated content page, wherein said updated content comprises components.

11. The method of claim 10, further comprising creating said components according to said request.

12. The method of claim 11, further comprising storing each of said components within a markup language file.

13. The method of claim 11, further comprising storing each of said components within a markup language file globally accessible by a reviewer.

14. The method of claim 13, wherein said components are decoupled from said content page.

15. The method of claim 14, further comprising creating said updated content page in response to each of said components having been authorized, wherein said updated content page does not include said components and comprises said content mapping data.

16. The method of claim 1, further comprising routing said components to a reviewer, wherein each of said components is individually routed.

17. An article of manufacture comprising a non-transitory, tangible computer readable medium having instructions stored thereon that, in response to execution by a computer-based system for managing digital content, cause said computer-based system to perform operations comprising:
presenting, by said computer-based system, a component created by a content author to a content approver for review wherein said content approver designates said component as an approved component;
storing, by said computer-based system, said approved component created by said content author in a globally accessible database,
wherein said approved component is decoupled from a content page,
wherein said approved component includes a category tag corresponding to user preferences;
retrieving, by said computer-based system, a category tag click count for said approved component corresponding to a user;
analyzing, by said computer-based system, said category tag click count and said category tag to determine a level of interest for establishing said user preferences;
retrieving, by said computer-based system, said approved component according to said established user preferences; and
positioning, by said computer-based system, said retrieved component on an updated content page, according to component content information comprising content mapping data, said content mapping data comprising:
instructions for mapping said retrieved component to said updated content page; and
information relating to at least one of: navigation components, cross-sell components, copyright components, page key word relationships, component type information, and information used in generating items on a page.

18. A system comprising:
a processor for managing digital content,
a tangible, non-transitory memory configured to communicate with the processor,
said tangible, non-transitory memory having instructions stored thereon that, in response to execution by said processor, cause said processor to perform operations comprising:
presenting, by said processor, a component created by a content author to a content approver for review, wherein said content approver designates said component as an approved component;

storing, by said processor, said approved component created by said content author in a globally accessible database, wherein said approved component is decoupled from a content page, wherein said approved component includes a category tag corresponding to user preferences;

retrieving, by said processor, a category tag click count for said approved component corresponding to a user;

analyzing, by said processor, said category tag click count and said category tag to determine a level of interest for establishing said user preferences;

retrieving, by said processor, said approved component according to said established user preferences; and positioning, by said processor, said retrieved component on an updated content page, according to component content information comprising content mapping data, said content mapping data comprising:

instructions for mapping said retrieved component to said updated content page; and information relating to at least one of: navigation components, cross-sell components, copyright components, page key word relationships, component type information, and information used in generating items on a page.

\* \* \* \* \*